US012333552B1

(12) United States Patent
Sadeddin et al.

(10) Patent No.: US 12,333,552 B1
(45) Date of Patent: Jun. 17, 2025

(54) COMMUNITY INFLUENCED APPROVAL CYCLE TIMES IN A SOFTWARE-AS-A-SERVICE SYSTEM

(71) Applicant: Coupa Software Incorporated, San Mateo, CA (US)

(72) Inventors: Ahmad Sadeddin, San Francisco, CA (US); Vincent Toesca, San Francisco, CA (US); Kira Letskina, San Carlos, CA (US)

(73) Assignee: Coupa Software Incorporated, San Mateo, CA (US)

( * ) Notice: Subject to any disclaimer, the term of this patent is extended or adjusted under 35 U.S.C. 154(b) by 357 days.

(21) Appl. No.: 17/700,286

(22) Filed: Mar. 21, 2022

Related U.S. Application Data

(63) Continuation of application No. 16/261,887, filed on Jan. 30, 2019, now Pat. No. 11,295,395.

(60) Provisional application No. 62/729,868, filed on Sep. 11, 2018.

(51) Int. Cl.
*G06Q 20/42* (2012.01)
*G06F 3/04842* (2022.01)

(52) U.S. Cl.
CPC ......... *G06Q 20/42* (2013.01); *G06F 3/04842* (2013.01)

(58) Field of Classification Search
CPC .... G06Q 20/18; G06Q 10/30; G06Q 20/4014; G06Q 20/40145; G06Q 30/06; Y02W 90/00; G06V 40/10; G07F 19/20; G07F 19/205; G06F 21/32

See application file for complete search history.

(56) References Cited

U.S. PATENT DOCUMENTS

| | | | |
|---|---|---|---|
| 6,882,986 B1 * | 4/2005 | Heinemann | G06Q 40/12 705/40 |
| 10,617,938 B2 | 4/2020 | Chen | |
| 2002/0002520 A1 | 1/2002 | Gatto | |
| 2003/0033167 A1 * | 2/2003 | Arroyo | G06Q 10/103 705/7.42 |

(Continued)

FOREIGN PATENT DOCUMENTS

WO 2010011652 A1 1/2010

OTHER PUBLICATIONS

Timothy Connolly, CFA (May 2013). A Look at Cash Conversion Cycle. CFA Institute. (Year: 2013).*

(Continued)

*Primary Examiner* — Peter Ludwig
(74) *Attorney, Agent, or Firm* — Baker Botts L.L.P.

(57) ABSTRACT

Techniques are disclosed for improving spend approval cycle time in a software-as-service (SasS) electronic spend management system based on community spend approval information. The techniques include the spend management system collecting information about spend approval cycle times across a community of users that use the system. A graphical user interface is then provided by the spend management system to individual customer users of the spend management system where the graphical user interface includes a graphical comparison of the user's individual spend approval cycle time performance against the community's spend approval cycle time performance. By doing so, the individual user can be motivated to improve or maintain his or her spend approval cycle time performance.

14 Claims, 6 Drawing Sheets

(56) References Cited

U.S. PATENT DOCUMENTS

| | | |
|---|---|---|
| 2005/0108153 A1* | 5/2005 | Thomas ................. G06Q 20/14 |
| | | 705/39 |
| 2008/0003559 A1 | 1/2008 | Toyama |
| 2008/0059292 A1* | 3/2008 | Myers .............. G06Q 10/06398 |
| | | 705/7.42 |
| 2009/0258710 A1 | 10/2009 | Quatrochi |
| 2009/0258719 A1* | 10/2009 | Wortman ........... A63B 69/3608 |
| | | 473/409 |
| 2011/0191217 A1* | 8/2011 | Saiu ................... G06Q 10/1091 |
| | | 705/30 |
| 2011/0282706 A1 | 11/2011 | Ezra |
| 2012/0185368 A1* | 7/2012 | Schloter ................. G06Q 40/00 |
| | | 705/30 |
| 2013/0096970 A1 | 4/2013 | Boss |
| 2017/0116552 A1 | 4/2017 | Deodhar |
| 2017/0296919 A1 | 10/2017 | Margiotta |
| 2019/0089784 A1* | 3/2019 | Bloy ................. G06Q 20/3821 |
| 2021/0209571 A1* | 7/2021 | Miller ................. G06Q 20/405 |

OTHER PUBLICATIONS

Coupa (2016). 12 Ways to Measure Spend Management Success. (2016).*

Zoe Uwem (2016). Track These 9 Accounts Payable Metrics To Optimize Your Invoice Processing. Pyrus Blog. (2016).* https://www.neogov.com/products/perform/ (Year: 2017).

* cited by examiner

FIG. 2

COMMUNITY INFLUENCED APPROVAL CYCLE TIMES IN A SOFTWARE-AS-A-SERVICE SYSTEM

CROSS-REFERENCE TO RELATED APPLICATIONS; BENEFIT CLAIM

This application claims the benefit under 35 U.S.C. 120 as a continuation of application Ser. No. 16/261,887, filed Jan. 30, 2019, which claims the benefit of provisional application 62/729,868, filed Sep. 11, 2018, the entire contents of which are hereby incorporated herein by reference for all purposes as if fully set forth herein.

TECHNICAL FIELD

The present disclosure relates generally to computer-implemented techniques for improving approval cycle times in a software-as-a-service system based on community approval information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The expansion of the internet has brought about a new class of centralized computing. Historically, centralized computing was implemented by mainframe computers in a time-sharing or utility computing model. More recently, application service providers (ASPs) provide businesses with the service of hosting and management of specialized business applications on the internet, with the benefit to the businesses of reducing costs through central administration and through the service provider's specialization in a particular business application.

Even more recently, an extension of the ASP centralized computing model known as "Software as a Service," or "SaaS," has emerged. SaaS differs from the ASP computing model in at least a few ways. For one, SaaS vendors typically develop and manage their own software, while ASPs primarily focus on managing and hosting third-party software. For another, many ASPs offer more traditional client-server applications, requiring installation of dedicated client software on users' personal computers. In contrast, SaaS solutions often require only an industry-standard web browser to use. Another difference is in the architecture. Most ASPs maintain separate application instances for each business served. SaaS providers, in contrast, normally utilize a multi-tenant architecture, in which the application serves multiple businesses and users, with data partitioned accordingly by data and network access controls.

Various different types of application services may be provided according to the SaaS model. One type of application service that may be provide is electronic spend management. There exist electronic spend management systems that help customers of suppliers manage their spend activities. The customers may include business, corporations, school, universities and governmental agencies, for example. Such spend activities conducted by customers using an electronic spend management system may include submission and approval of purchase requisitions and purchase orders, receipt and approval of payment of invoices, and submission and approval of expense reimbursement requests (e.g., expense reports). Historically, electronic spend management systems were enterprise in nature with each customer separately purchasing and maintaining their own system instance on their premises. Today, many customers use SaaS-based electronic spend management systems to manage and conduct their spend activities online.

One challenge customers face using SaaS-based electronic spend management systems is timely spend approvals. With regard to approving purchase requisitions as purchase orders that can be submitted to suppliers, customers must balance the need for speedy approvals against the need for controlling spend. One way to effectively strike this balance using electronic spend management systems is to allow customers to configure the system to automatically approve certain purchase requisitions under certain conditions. For example, purchase requisitions submitted by certain employees for certain commodities may be automatically approved if under a certain specified spend amount. Nonetheless, there may still be a requirement of customers to have a human review and approve certain purchase requisitions (e.g., by providing appropriate user input to the system after reviewing the requisition). This requirement may stem from the desire of the customer for control over spend including making sure commodities being requested are necessary and that employees are getting the best price and from an approved supplier. The ability of customers to quickly turn employee requisitions into purchase orders is critical for employee satisfaction, business agility and financial control. Similarly, for expenses, fast turnaround of employee expense reports improves employee satisfaction, provides more timely visibility into travel and expense spending and reduces credit card late fee charges. Unfortunately, given the requirement that a human must review and approve purchase requisitions and expense reports that are not automatically approved, there is a room for improving spend approval cycle time in SaaS-based electronic spend management systems.

Computer-implemented techniques disclosed herein address these and other issues.

SUMMARY

The appended claims may serve as a useful summary of disclosed techniques for improving spend approval cycle time in a software-as-a-service electronic spend management system based on community spend approval information.

BRIEF DESCRIPTION OF THE DRAWINGS

In the drawings:

FIG. 1, FIG. 2, FIG. 3 each depicts an example graphical user interface that includes a graphical comparison between an individual user's spend approval cycle time performance and the spend approval cycle time performance of a community of users.

DETAILED DESCRIPTION

Figure 1:
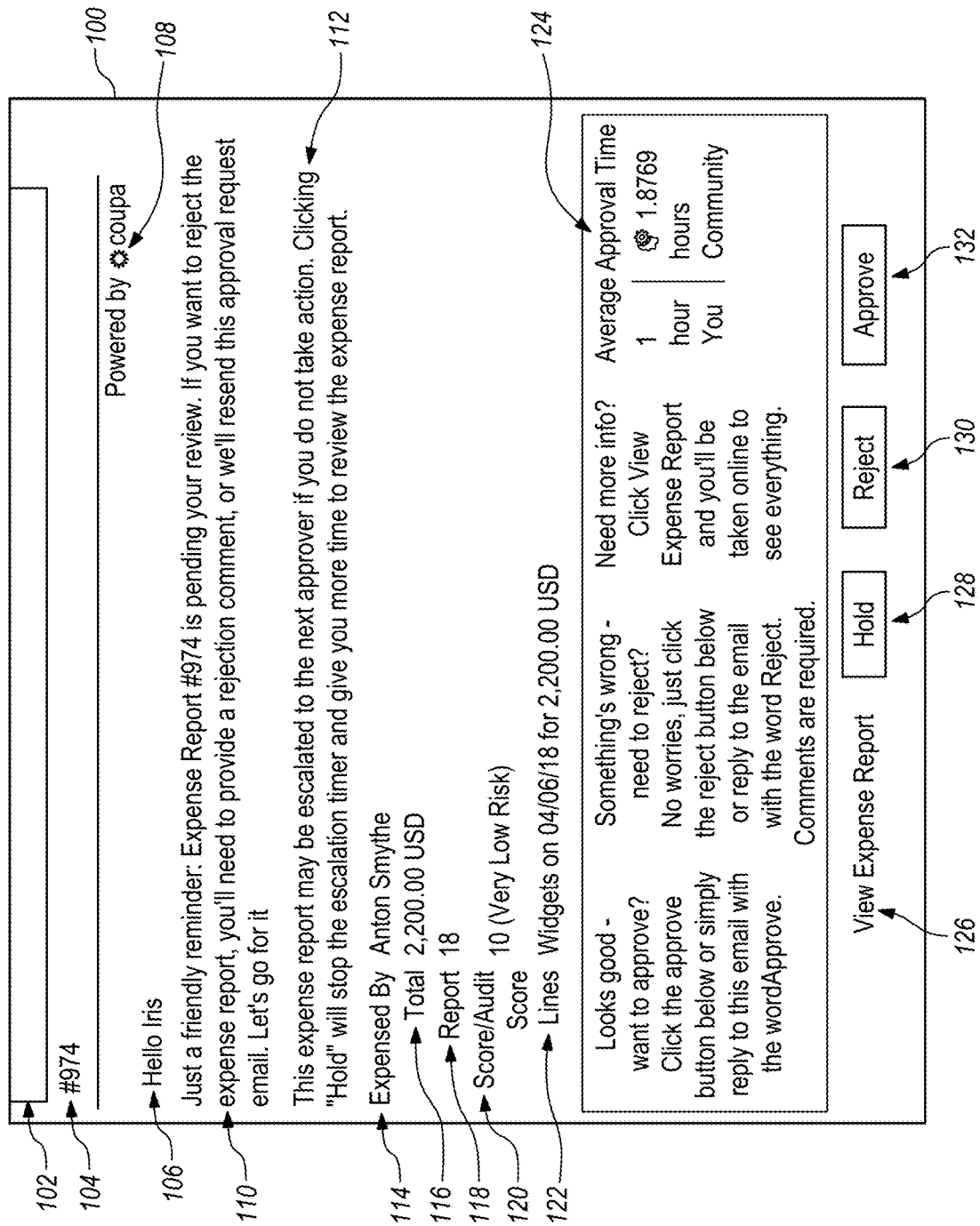

In the following detailed description, for the purposes of explanation, numerous specific details are set forth in order to provide a thorough understanding of various embodiments of improving spend approval cycle time in a software-as-service (SasS) electronic spend management system based on community spend approval information. It will be apparent, however, that the embodiments may be practiced without these specific details. In other instances, well-known structures and devices are shown in block diagram form in order to avoid unnecessarily obscuring the embodiments.

General Overview

Computer-implemented techniques are disclosed for improving spend approval cycle time in a software-as-service (SasS) electronic spend management system based on community spend approval information. In this description, spend approval cycle time refers generally to a length of time between (1) when a user of the system is able to use the spend management system to approve a particular purchase requisition, invoice or expense report that is pending approval and (2) when the user actually uses the spend management system to take an approval action on the particular requisition, invoice or expense report. The approval action can include the user providing user input to the spend management system that approves the particular requisition for submission as a purchase order to suppliers, that approves the particular invoice for payment to the supplier, or that approves the particular expense report for reimbursement to the submitter of the expense report. In some scenarios, the approval action can also include the user providing user input to the spend management system that rejects or defers for a period of time the approval decision for, the particular requisition, invoice or expense report.

The techniques include the spend management system collecting information about spend approval cycle times across a community of customers that use the system. A graphical user interface is then provided by the spend management system to individual customer users of the spend management system where the graphical user interface includes a graphical comparison of the customer user's spend approval cycle time performance against the community's spend approval cycle time performance. By doing so, the individual customer user can be motivated to improve or maintain his or her spend approval cycle time performance.

Conventional approaches for improving spend approval cycle time may provide only statistics about an individual customer user's spend approval cycle time performance without comparison to a community of users. These individual-only statistics might include for example how many purchase requisitions or expense reports are waiting for an approval action by the user and how long they have been waiting for an approval action. In contrast, the disclosed techniques unconventionally provide a graphical user interface-based comparison of individual spend approval cycle time performance versus community spend approval cycle time performance thereby allowing customer users to more efficiently and accurately determine whether their spend approval cycle time performance is below, at, or above par as set by the spend approval cycle time performance of the community.

An implementation of the techniques may encompass performance of a method or process by a computing system having one or more processors and storage media. The one or more processors and storage media may be provided by one or more computer systems. An example computer system is described below with respect to FIG. 6. The storage media of the computing system may store one or more computer programs. The one or more computer programs may include instructions configured to perform the method or process.

In addition, or alternatively, an implementation of the techniques may encompass instructions of one or more computer programs. The one or more computer programs may be stored on one or more non-transitory computer-readable media. The one or more stored computer programs may include instructions. The instructions may be configured for execution by a computing system having one or more processors. The one or more processors of the computing system may be provided by one or more computer systems. The computing system may or may not provide the one or more non-transitory computer-readable media storing the one or more computer programs.

In addition, or alternatively, an implementation of the techniques may encompass instructions of one or more computer programs. The one or more computer programs may be stored on storage media of a computing system. The one or more computer programs may include instructions. The instructions may be configured for execution by one or more processors of the computing system. The one or more processors and storage media of the computing system may be provided by one or more computer systems.

If an implementation encompasses multiple computer systems, the computer systems may be arranged in a distributed, parallel, clustered or other suitable multi-node computing configuration in which computer systems are continuously, periodically or intermittently interconnected by one or more data communications networks (e.g., one or more internet protocol (IP) networks.)

Users

Techniques disclosed herein improve spend approval cycle time in a software-as-a-service electronic spend management system by using community spend approval information to motivate users to improve or maintain their spend approval cycle time performance.

At the outset, it is helpful to understand different users of the system. At the highest level, there are two main categories of users: customer users and supplier users. Within the customer user main category there are two sub-categories of customer users that differ on their roles when using the system. In one sub-category, there are approvers. Approvers are customer users that are responsible for using the spend management system to review and approve (or reject) purchase requisitions, expense reports, or both purchase requisitions and expense reports. The other customer user sub-category is non-approvers and may make up the bulk of the customers users of the spend management system for a particular customer. Non-approvers use the spend management system to submit purchase requisitions and expense reports.

It should be noted that all approvers may also be able to submit purchase requisitions and expense reports to the system. In this case, other designated approvers may review and approve (or reject) those submissions according to access controls and permissions configured with the spend management system.

A customer user of the system including all approvers and non-approvers may be an agent (e.g., employee) of a customer, which is typically a business, corporation or other organizational entity, or a division, department or other sub-organizational entity thereof, that purchase goods and services (e.g., commodities) from one or more suppliers.

A supplier user of the spend management system may be an agent of a supplier, which is typically a business, corporation or other organization entity, or a division, department or other sub-organizational entity thereof, that sells or goods and services to one or more customers. Of course, a customer of one supplier can be a supplier to another customer and, likewise, a supplier for a customer can be a customer of another supplier.

Typically, customers each have one or more customer accounts with the spend management system against which customer users including non-approvers, acting as agents of a customer, can authenticate and gain access to the spend management system to perform various authorized customer-side e-procurement functions using the spend management system such as for example generating purchase orders for suppliers, submitting purchase orders to suppliers, receiving invoices from suppliers and approving payment of supplier invoices.

Depending on which customer account a customer user successfully authenticates against will determine whether the customer user may use the spend management system as an approver or non-approver according to permissions associated with the customer account. Approvers may perform additional customer-side e-procurement functions using the spend management system including approval actions such as for example reviewing details of purchase requisitions and expense reports awaiting approval, approving purchase requisitions for submission as purchase orders, approving expense reports for reimbursement to requestors, rejecting purchase requisitions, and rejecting expense reports.

When reviewing a purchase requisition or an expense report awaiting approval using the spend management system, the approver may be presented with a variety of different information about the purchase requisition or expense report such as for example the name of the requestor, the date of the submission, the commodities requested or expensed, and monetary amounts associated with the requested or expensed commodities (e.g., line items), etc.

The spend management system may provide a virtual queue or other workflow mechanism by which purchase requisitions and expense reports awaiting approval by an approver are organized. For example, a graphical list of purchase requisitions or expense reports awaiting approval may be presented by the spend management system to the approver in first-in-first-out (FIFO) order in order of time and date of submission for approval. Other arrangements are possible are no particular organization of an approver's queue of purchase requisitions and expense reports awaiting approval is required. For example, there may be separate per-approver queues for purchase requisitions and expense reports. Further, approval items (e.g., purchase requisitions and expense reports) awaiting approval may be arranged in the queue in different orders such as for example according to priority in addition to or instead of time and date of submission.

Suppliers may have supplier accounts with the spend management system against which supplier users acting as agents of a supplier can authenticate against and perform various supplier-side e-procurement functions using the spend management system such as for example receiving purchase orders from customers and submitting invoices to customers.

Example Graphical User Interface

FIG. 1 depicts an example graphical user interface (GUI) 100 that includes a graphical comparison 124 between an individual approver's average spend approval cycle time performance and the average spend approval cycle time performance of a community of approvers. The GUI 100 also includes a number of other graphical user interface elements including a title 102, an expense report number 104, a salutation 106, a logo 108, a first message 110, a second message 112, expense report information 114, 116, 118, 120, 122, a view expense report link 126, a hold button 128, a reject button 130, and an approve button 132.

In this example, the GUI 100 is an electronic mail message (e-mail) automatically sent by the spend management system to an approver to remind the approver that an expense report is waiting for an approval action. The GUI 100 includes a title 102 indicating the nature of the e-mail. In particular, that the e-mail is being sent to remind the approver that an expense report submitted by "Anton Smythe" is awaiting an approval action. The GUI 100 also includes an expense report number 104 that identifies the expense report. The GUI 100 also includes a salutation 106 to the approver. A logo 108 of the spend management system provider is included in the GUI 100 so that the approver can recognize the spend management that sent the e-mail reminder. A first message 110 reminds the approver that the referenced expense report is awaiting for an approval action which can include rejecting the expense report. A second message 112 instructions the approver on a hold option which will pause an escalation timer.

In some implementations, the spend management system maintains an escalation timer for an approver and an approval item awaiting an approval action by the approver. The item can be a purchase requisition or an expense report, for example. The escalation timer starts when the item enters the approver's approval queue and is available for the approver to take an approval action on the item using the spend management system. The escalation timer stops when the approver takes an approval action (i.e., approve or reject) or when the escalation timer expires. The escalation timer may expire after a predetermined amount of time (e.g., 48 hours, one week, 30 days, etc.) If the escalation timer expires, the spend management system may automatically add the item to another approver's approval queue and the escalation timer restarted for that other approver and the item. In this way, an item waiting approval does not remain indefinitely in a single approver's approval queue. Customer may configure the spend management system with escalation chains of approvers that are followed by the spend management system when expiration timers expire for a given approver and item.

In some implementations, an approver can pause the escalation timer for an item waiting for an approval action by the approver. By pausing the escalation timer, the approver is provided more time to review the item to determine the appropriate approval action. The escalation timer may automatically restart after a predetermined amount of time since being paused (e.g., 24 hours) to avoid the item remaining in a single approver's approval queue indefinitely.

GUI 100 also includes summary information about the expense report waiting for an approval action include the name 114 of the customer user that submitted the expense report, a total monetary amount 116 of the reimbursement requested by expense report, an identifier 118 of the expense report, a spend risk score 120 that indicates to the approver the risk of fraud in the expense report submission, and line items 122 that provide detail on the commodities and cost for which reimbursement is being requested.

As mentioned, GUI 100 includes a graphical comparison 124 between the approver's average spend approval cycle time and the average spend approval cycle time of the community. In this example, the graphical comparison 124 indicates that the approver's average spend approval cycle time is one hour while the average spend approval cycle time of the community is almost two hours. Thus, on average, the approver's approval cycle time performance is better than the community's.

GUI 100 also includes a link 126 which, if activated by the approver with appropriate user input (e.g., a click), provides another graphical user interface with details about the expense report for the approver's review. GUI 100 also includes an actionable hold button 128 which, if activated by the approver with appropriate user input, pause the escalation timer for the expense report. GUI 100 also includes an actionable reject button 130 which, if activated by the approver with appropriate user input, will start a process of rejecting the expense report. This process may include the approver providing a comment or description about why the expense report is rejected. GUI 100 also includes an actionable approve button 132 which, if activated by the approver with appropriate user input, will start a process of approving the expense report. As a result of the approve process, the submitter of the expense report ("Anton Smythe") is reimbursed for his expenses.

In some implementations, pausing (e.g., by activating hold button 128) the escalation timer for an approval item also pauses the approval cycle timer for the approval item. When the escalation timer un-pauses (continues elapsing), the spend approval cycle timer may also then un-pause (continue elapsing). The escalation timer and the spend approval cycle timer may also automatically pause for non-business operating time periods such as for example non-business hours, weekends, and holidays. To take an example, suppose regular business hours are 9 am to 5 pm and the escalation timer is configured to expire after 8 hours. In this case, if an approval item is added to an approver's queue at 10 am on Monday, then, assuming no further action, the escalation timer would expire at 10 am on the next day (Tuesday). With this example, if the approver takes an approval action (e.g., approve or reject) on the approval item at 9:30 am on Tuesday, then the spend approval cycle time for this approval item is seven and one-half (7½) hours (from 10 am on Monday to 5 pm on Monday plus from 9:00 am on Tuesday to 9:30 am on Tuesday.) Similarly, if the approver places a hold on the approval item that pauses the escalation timer, this action may also pause the spend approval cycle timer for the period of time that the escalation timer is paused. For example, assume the approver places a hold on the approval item at 3 pm on Monday. In that case, the escalation timer would expire at 3 pm the next day (Tuesday), if no further action is taken by the approver. This would also be the time that the spend approval cycle timer for the approval item would continue elapsing. Continuing the example, assuming the approver takes an approval action on the approval item at 9:30 am on Tuesday, then the spend approval cycle time for in this case would be five (5) hours from 10:00 am on Monday to 3 pm on Monday when the approver placed a hold on the approval item. The time from 3 pm on Monday to 5 pm on Monday and the time from 9:00 am on Tuesday to 9:30 am Tuesday would not be included in the spend approval cycle time because the spend approval cycle time was paused for this time as a result of the hold placed on the approval by the approver at 3 pm on Monday.

Thus, in some implementations, the escalation timer for an approval item may start when the approval cycle time timer starts and both of these timers may start when the approval item is added to an approver's approval queue. The approval cycle time timer may also pause when the escalation timer is paused either by the approver (e.g., by placing a temporary hold on the approval item) or automatically by the spend management system (e.g., during off-business hours, weekends, and holidays). The approval cycle time timer may continue to elapse (un-pause) when the escalation timer begins elapsing again (un-pauses). Note that the approval cycle time for an approval item can be longer than the expiration period of the escalation timer if the approve takes an approval action on the approval time after the escalation timer has expired.

Graphical Comparison of Approval Cycle Time Performance

The graphical comparison 124 allows the approver to efficiently and accurately determine the individual approver's approval cycle time performance compared to a community of approvers. The community can include all approvers across all customers having customer accounts with the spend management system, or a selected subset thereof. Thus, the approvers in the community of approvers against which the approver's approval cycle time performance is compared in the graphical comparison 124 need not be limited to only approvers employed or associated with the same customer as the individual approver, although they can be according to the requirements of the particular implementation at hand. Instead, the community of approvers for comparison may include approvers across multiple customers including customers for which the individual approver has no affiliation or relationship.

If a subset of all approvers is selected for inclusion in the community of approvers against which the individual approver's cycle time performance is compared, then the subset may be selected based on one or more similarities of the community of approvers to the individual approver for which the graphical comparison 124 is provided. For example, a community of approvers to which the individual approver belongs can be formed by the spend management system according to similarity or sameness of a variety of different stored characteristics of the approvers including all of the following characteristics, a subset of these characteristics, or a superset thereof:

Job function, title, department or role of the approver,
Approver's level in an approval escalation chain,
Customer that the approver is acting as an agent of,
Geographic region (e.g., county, metro area, state, country, sales region, etc.) of the approver, and
Industry or line of business of the customer that the approver is acting as an agent of.

For example, the community of approvers against which an individual approver is compared with regard to approval cycle time performance may include all approvers acting as agents of the same customer that the individual approver acts as an agent of, or all approvers in the same department of the same company as the individual approver.

As mentioned above, cross-customer communities are also possible. For example, the community of approvers for a comparison may include all approvers (or a selected subset thereof) of all customers (or a selected subset thereof) of the electronic spend management system. For example, the community of approvers for a comparison may include approvers of customers using the spend management platform in a same general industry (e.g., agriculture, construction, manufacturing, transportation, retail, finance, services, etc.).

More generally, embodiments are not limited to any particular set or subset of approvers or customers that are selected for inclusion in the community for a comparison and the approvers selected for inclusion in the community for the comparison may be selected according to a variety of different criteria including, but not limited to, the criteria discussed above.

Once the spend management system has selected a community of approvers for comparison, then average approval cycle times may be computed for the community of approvers. In some implementations, separate average approval cycle times are computed for different types of approval items. For example, separate average approval cycle times may be computed for purchase requisitions and expense reports or other specific type of approval item to which the current approval pertains. For example, the average approval cycle time of the community depicted in graphical comparison 124 may reflect the average approval cycle time of the community for just expense report approvals.

The average approval cycle time can be computed based on stored actual historical approval cycle times for a set of approval items for which approvers in the community of approvers took an approval action on. The set of approval items may be those that fall into a predetermined period of time such as for example the past quarter or past year, or other past period of time, or in a particular quarter or a particular year or other particular period of time.

In addition, or alternatively, to computing the average approval cycle time, the median approval cycle time can be computed. For the average or median, the individual approver's stored actual historical approval cycle times can be included or not included in the community calculation according to the requirements of the particular implementation at hand.

The individual approver's average spend approval cycle time can be computed based on stored historical approval cycle times for a set of approval items for which the individual approver took an approval action on. These set of approval items may fall into the same predetermined time period as the set of approval items for the community calculation.

In the example depicted in FIG. 1, the graphical comparison 124 includes a numerical representations of the individual approver's and the community's average spend approval cycle time. However, other graphical representations are possible such as for example a bar chart or a column chart. These other graphical representations may be used in addition to or instead of numerical representations. For example, the individual approver's average spend approval cycle time compared to the community may be represented by icons, emoticons, and/or colors. For example, a sad or disapproving face icon or other suitable icon may be displayed as part of the graphical comparison 124 to represent that the individual approver's average spend approval cycle time is in a bottom percentile (e.g., bottom 25%) of the average spend approval cycle times of all approvers in the community. On the other hand, a happy or approving face icon or other suitable icon or graphic may be displayed as part of the graphical comparison 124 to represent that the individual approver's average spend approval cycle time is in a top percentage (e.g., top 25%) of the average spend approval cycle times of all approvers in the community.

While in the example depicted in FIG. 1 the graphical comparison 124 pertains to spend approval cycle times for expense reports, a graphical comparison provided in a graphical user interface to an individual approver could instead pertain to purchase requisitions or invoices. For example, an individual approver may receive an e-mail like the one depicted in FIG. 1 except for a purchase requisition or invoice that is awaiting an approval action by the individual approver. In this case, the graphical comparison 124 may compare the individual approver's average spend approval cycle time performance for purchase requisitions or invoices against the community's average spend approval cycle time performance for purchase requisitions or invoices, as opposed to for expense reports.

While in the example depicted in FIG. 1 the graphical comparison 124 is provided in an e-mail message automatically sent by the spend management system to an individual approver, the graphical comparison 124 or one like it can be provided to the individual approver in other contexts. For example, the graphical comparison 124 could be provided on a web page that is served to the individual approver. The web page for example could be a "home" page that is provided to the individual approver by default after successfully authenticating against a customer account held with the spend management system. For example, the home page can be configured as a dashboard graphical user interface that provides an overview of the individual approver's approval queues including for example the number of approval items waiting an approval action by the approver along with the graphical comparison 124.

Figure 2:
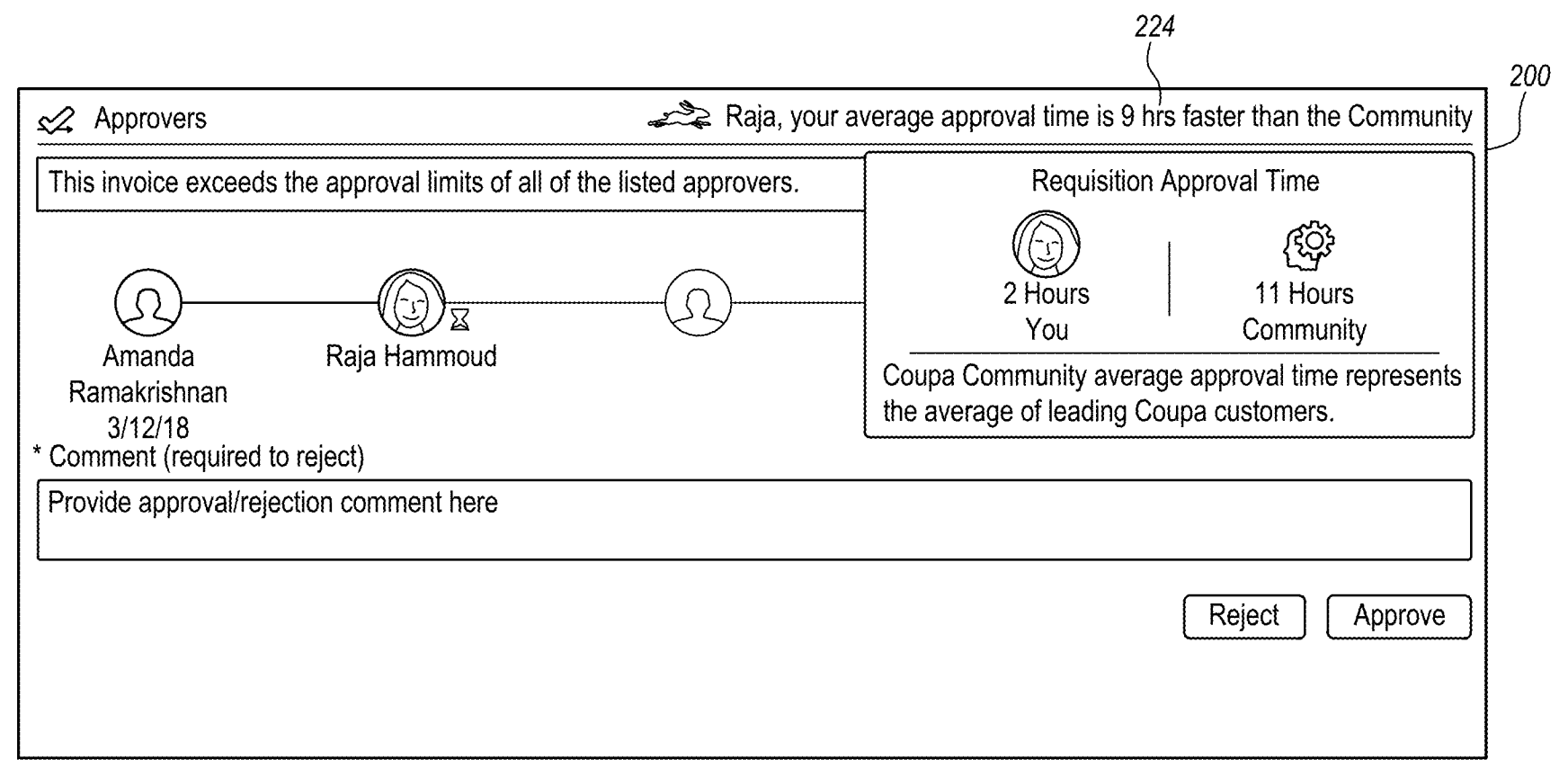
Figure 3:
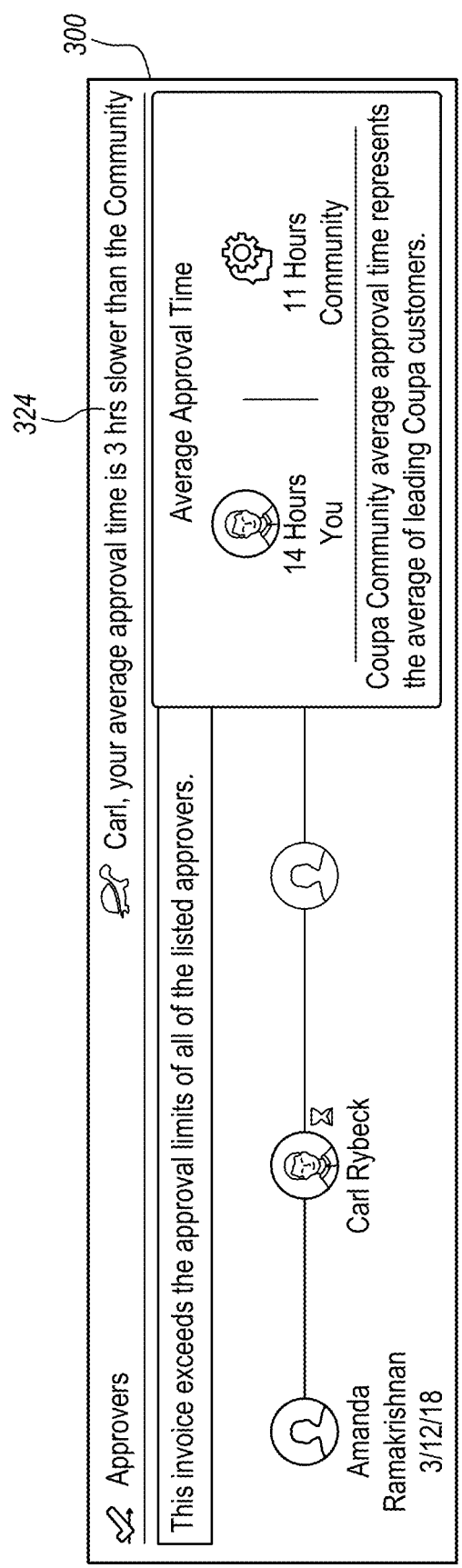

For example, FIG. 2 depicts a web page 200 that includes a graphical comparison 224 comparing the average requisition approval cycle time for an approver "Raja" against a community of requisition approvers across selected customers of the electronic spend management platform. The web page 200 may be presented, for example, in response to approver "Raja" selecting the requisition on another web page that lists requisitions awaiting approval by approver "Raja." From the graphical comparison 224, approver "Raja" can see that she approves requisitions faster on average than the community does. In this way, approver "Raja" may be motivated to keep up her above-average approval pace. In contrast, as depicted in the web page graphical user interface 300 of FIG. 3, approval "Carl" can see that his average approval cycle time for requisitions is 3 hours slower than the average of the selected community. By presenting the graphical comparison 324 to an approver "Carl," he may be motivated or shamed into improving his approval cycle time performance.

Example Networked Computing Environment

Figure 4:
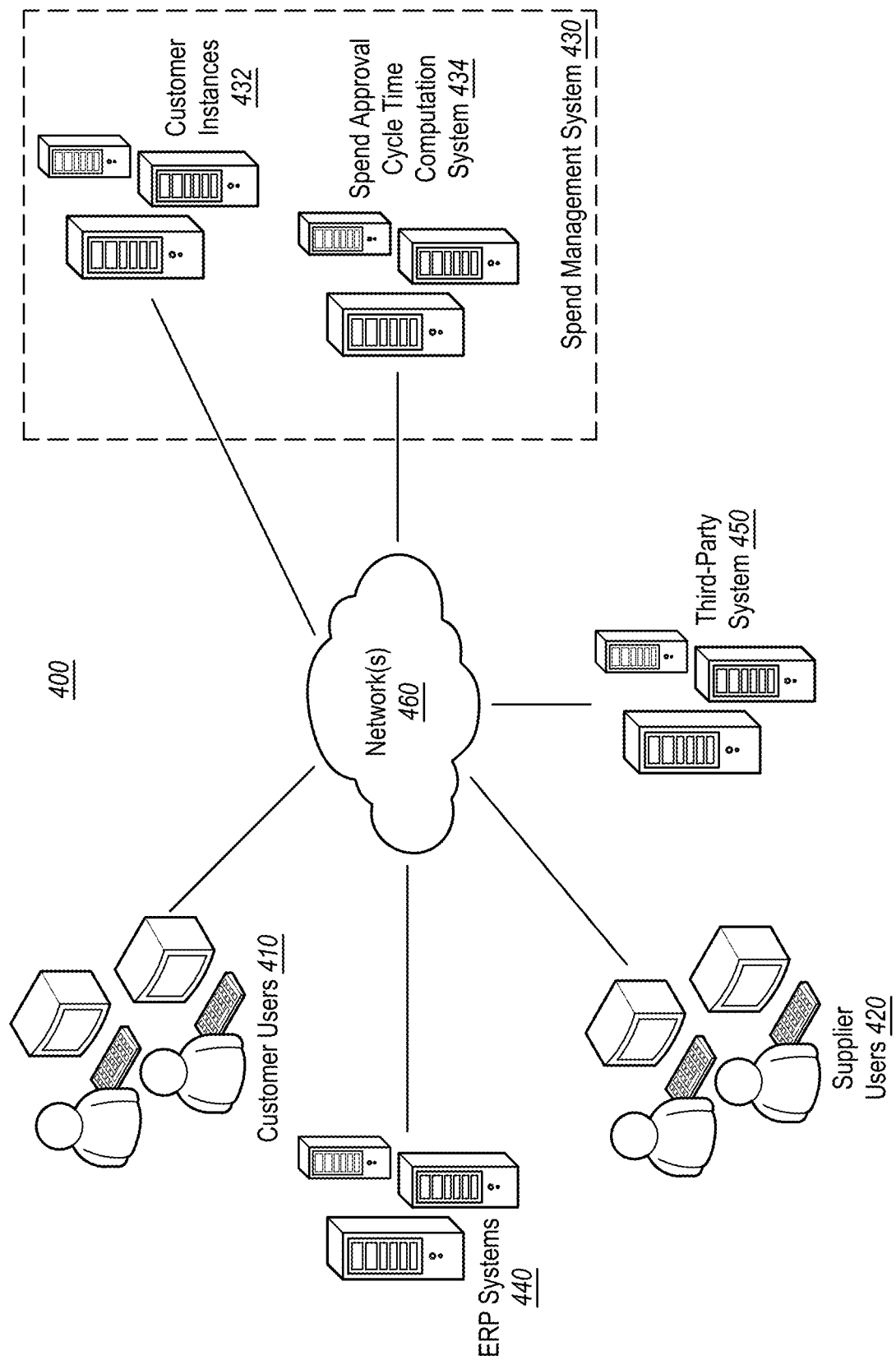
FIG. 4 depicts an example networked environment in which techniques for improving spend approval cycle time in a software-as-a-service electronic spend management system based on community spend approval information may be implemented.

FIG. 4 depicts an example networked computing environment 400 in which techniques for improving spend approval cycle times in a software-as-a-service electronic spend management system based on community spend approval information may be implemented.

Environment 400 includes customer users 410 with their respective personal computer systems, enterprise resource planning (ERP) computer systems 440, supplier users 420 and their respective personal computer systems, third-party computer systems 450, network(s) 460, and software-as-a-service electronic spend management system 430 that includes customer instances 432 and spend approval cycle time computation system 434.

Customer instances 432 may store may store private customer approval queue and private customer spend approval cycle time information on a per-customer basis. Spend approval cycle time computation system 434 may collect the private customer spend approval cycle time information in an anonymized form from the customer instances 432 and compute community spend approval cycle time statistics such as community average spend approval cycle times for each community and for each of purchase requisitions, expense reports and invoices for each community. The resulting computed community average spend approval cycle times may then be provided back to the customer instances 432. Customers instances 432 may then use the provided community average spend approval cycle times when causing graphical comparisons (e.g., 124) to be presented in a graphical user interface (e.g., 100) to individual approvers. Each customer instance 432 may separately compute individual average spend approval cycle times per approver that uses the customer instance 432 including for each of purchase requisitions, expense reports and invoices per approver, if the approver has taken an approval action on a purchase requisition, an expense report or an invoice, respectively.

It should be noted that the spend management system 430 may allow a customer to opt-out of the community calculation, for privacy reasons. That is, the customer can configure the system 430 so that spend approval cycle time statistics for their approvers recorded and stored at their customer instance 432 is not provided to the spend approval cycle time computation system 434 for inclusion in the community statistics computation. In this way, the privacy of the customer may be preserved.

Customer users 410 use their personal computers to interact with spend management system 430 over network(s) 460 according to one or more online interaction protocols. The personal computers can include desktop computers, laptop computers, tablet computers, mobile phones, or like personal computing devices. The online interaction protocol(s) may be supported by both a client application that executes at the personal computers of the customer users 410 and a server application that executes at one or more server computers that host the spend management system 430. For example, the client application and the server application may exchange data over network(s) 460 using the HTTP/S networking protocol. The data exchanged may be formatted in a variety of different ways including for example as HTML, CSS, Javascript, XML, JSON, etc. The client application may be an industry-standard web browser application or a mobile application, for example. The spend management system 430 may cause particular graphical user interfaces (e.g., web pages with particular content) to be displayed by the client applications at the personal computers of the customer users 410 by using the online interaction protocol(s) and network(s) 460 to send information to the personal computers of the customer users 410 for processing by the client applications. Customer users 410 may interact with the spend management system 430 by directing user input (e.g., keyboard, pointing device or touch input) to the graphical user interfaces, thereby causing the client applications to use the online interaction protocol(s) to send information over network(s) 460 to the spend management system 430. Supplier users 420 may likewise use their personal computers to interact with the spend management system 430 over network(s) 460 according to the online interaction protocol.

The spend management system 430 may be hosted in a public cloud. The public cloud may include computing services offered by third-party providers over the public internet (e.g., network(s) 460), making them available to anyone who wants to use or purchase them. The computing services may be sold on-demand, allowing the spend management system 430 provider to pay only per usage for the CPU cycles, storage or bandwidth consumed. Even though the provider of spend management system 430 may not also provide the public cloud computing services, the spend management system 430 provider may still be responsible for management and maintenance of the spend management system 430 within the public cloud, including putting the spend management system 430 in service on network 460.

Customers may integrate ERP systems 440 and third-party systems 450 with spend management system 430 via network(s) 460. The purpose of the integration may be to import spend approval cycle time statistics and associated information into spend management system 430. Such records and data imported into the spend management system 430 from ERP systems 440 and third-party systems 450 may be processed by applications of the spend management system 430 including an application that implements techniques disclosed herein for improving spend approval cycle times.

The integration over network(s) 460 may be accomplished using one or more data integration protocols. One possible integration protocol is using flat files uploaded to and downloaded from a secure file transfer protocol (SFTP) server operated by the spend management system 430 provider. The flat files may be CSV files, for example, that contain spend approval cycle time statistics and associated information. Another possible integration protocol for importing supplier information data is using a REST API offered by servers of the spend management system 430 For example, the flat file integration protocol may be used for bulk import of supplier information, and the REST API integration protocol may be used for real-time import of supplier information including spend approval cycle time statistics.

Example Procure-to-Pay Process

Figure 5:
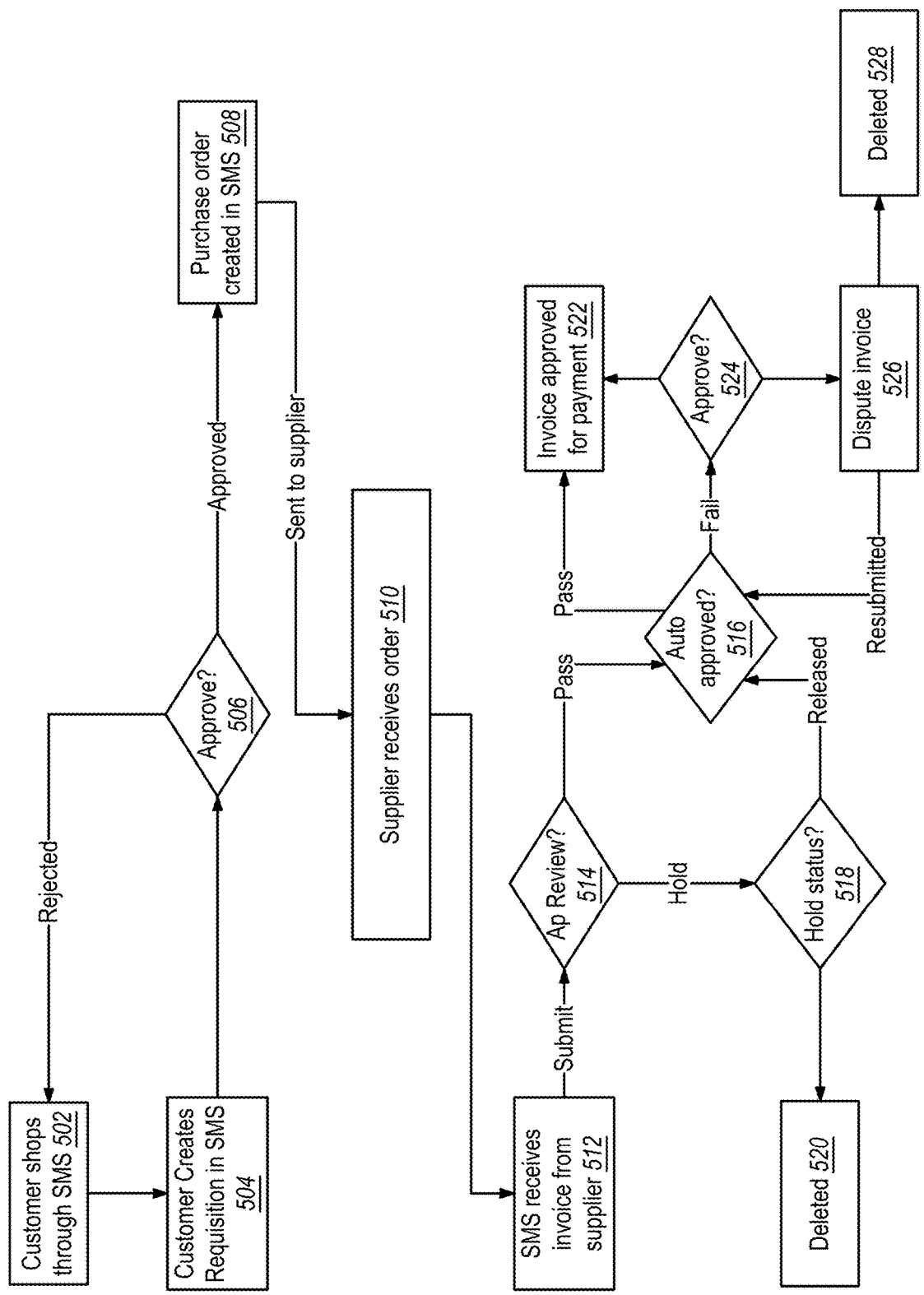
FIG. 5 is a flowchart of a procure-to-pay process that may be conducted by users of a software-as-a-service electronic spend management system and that may incorporate techniques for improving spend approval cycle time in a software-as-a-service electronic spend management system based on community spend approval information.

FIG. 5 is a flowchart of an example procure-to-pay process 500 that may be facilitated by a software-as-a-service electronic spend management system. The process 500 encompass various spend approval cycles as indicated below. During performance of the process 500, a customer user and a supplier user may perform various respective steps. Performance of a step by the customer user or the supplier user may involve the user interfacing with the system from their personal computing device using a local client application (e.g., a web browser application) and a network (e.g., the internet) that connects the personal computing device to servers of the system. Such interfacing may include receiving data, media and information from the system over the network for presentation by the local client application and involve providing input, data and information from the user to the system via the local client application and the network.

At step 502, the customer user shops online through the system for commodities the customer user wishes to purchase. For example, the customer user may browse, or search, catalogs uploaded to the system by suppliers. The catalogs may have been previously uploaded or otherwise input to the system such as for example by bulk upload (e.g., in comma separated value (CSV) format) or through integration via an application programming interface with a third-party enterprise resource planning (ERP) system. Alternatively, the customer user may shop directly on a supplier's website whereby items added to an online shopping cart are sent back to the system when the customer user checks out. The transfer of purchased items from the supplier website online shopping cart back to the system may be facilitated by a protocol for communication of business documents between the website and the system such as for example commerce eXtensible Markup Language (cXML) or the like.

At step 504, the customer user uses the system to create a requisition in the system for one or more commodities that the customer user has selected for purchase at step 502. This action may cause an approval item for the requisition to be added to an approval queue of an approver and start the escalation timer and the spend approval cycle timer for the requisition.

At step 506, the requisition may be approved or rejected 106 by the approver. This may cause the approval item to be removed from the approval queue for the approver and stop the escalation timer and the spend approval cycle timer for the requisition. The time elapsed on the spend approval cycle timer may be recorded for the requisition and the approver.

If the requisition is approved at step 506, then, at step 508, then the system creates and stores a purchase order for the requisition. The system may then send the purchase order to the supplier. The system may send the purchase order to the supplier to in a variety of different ways and in a variety of different formats. Some of the different ways and formats that the system may send the purchase order to the supplier include by Email, by cXML, by proprietary eXtensible Markup Language (XML), by a Value-Added Network (EDI VAN), etc.

At step 510, the supplier receives the purchase order sent by the system.

Next at step 512, the system receives an invoice corresponding to the purchase order from the supplier. The system may receive the invoice from the supplier in a variety of different ways and in a variety of different formats. For example, the system may receive the invoice from the supplier by Email, by cXML, by Advance Ship Notice (ASN), etc.

At step 514, the system determines whether an accounts payable hold should be placed on the invoice. The system may make this determination according to configuration provided by the customer. For example, the customer may configure the system to place an account payable hold on all invoices, or a subset of invoices that satisfy customer-specified criteria, so that a customer user in the account payable department of the customer can use the system to review the invoice before the invoice is considered by the system for auto-approval at step 516. If the invoice is not subject to an accounts payable review at step 514, then the invoice may pass for consideration of auto-approval by the system at step 516. If the invoice is subject to an accounts payable review at step 514 and a hold is placed on the invoice by a customer user, then the invoice may remain in the hold state 518 until is the invoice is deleted 520 by a customer user or released by a customer user for consideration of auto-approval by the system at step 516.

At step 516, the system considers the invoice for auto-approval of payment. The system may make this consideration according to pre-configured criteria specified by the customer. For example, the customer may configure the system to auto-approve invoices below a specified monetary amount threshold, invoices for purchase orders submitted by specified customer users, invoices for certain specified commodities or some combination thereof.

If the invoice is auto-approved for payment by the system at step 516, then the system may automatically arrange for payment of the invoice at step 522. The system may make the payment using a variety of different payment methods including for example by the customer's net terms, the supplier's P-card, etc.

On the other hand, if the invoice is not auto-approved for payment by the system at step 516, then the invoice may wait for manual approval at step 524 by a customer user. This may cause an approval item for the invoice to be added to an approval queue of an approver and start the escalation timer and the spend approval cycle timer for the invoice.

If manually approved at step 524, then the invoice is paid by the system at step 522. This may cause the approval item for the invoice to be removed from the approval queue for the approver and stop the escalation timer and the spend approval cycle timer for the invoice. The time elapsed on the spend approval cycle timer may be recorded for the invoice and the approver.

If the customer user disputes 526 the invoice, then the invoice may eventually be resubmitted for auto-approval, perhaps after modifications by the supplier, or deleted 528.

The above-described procure-to-pay process is presented for purposes of illustrating a basic procurement process that may be facilitated by the software-as-a-service electronic spend management system when a customer and a supplier are linked through the system. However, the techniques disclosed herein for improved linking of customers with suppliers based on community supplier information are not limited to any particular procure-to-pay process. Instead, the techniques may be used in conjunction with a variety of different procure-to-pay processes including those with different arrangement of steps, other steps or only some of the steps depicted in FIG. 1.

Example Hardware Implementing Mechanism

Figure 6:
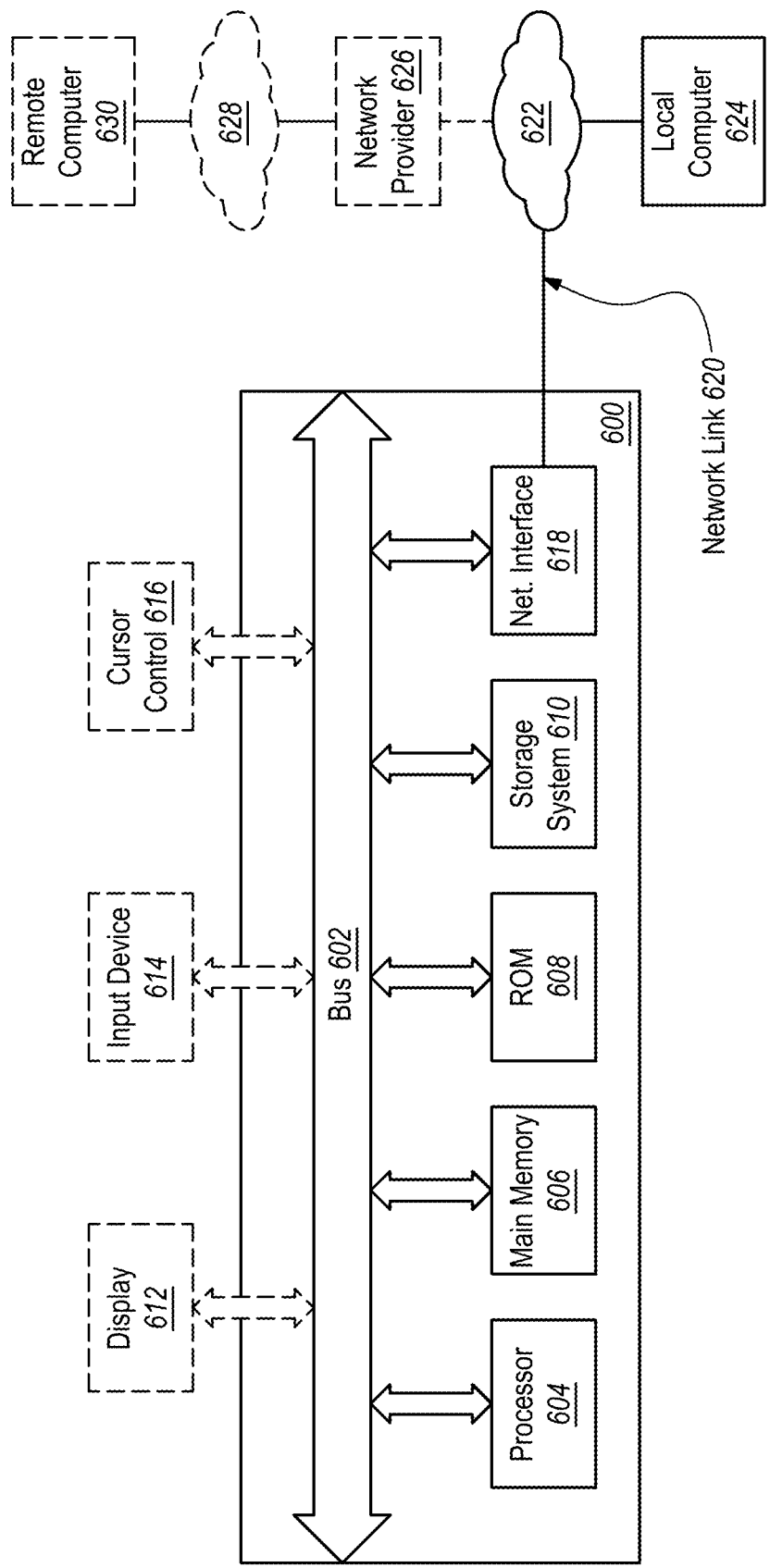
FIG. 6 depicts an example computer system that may be used in an implementation of improving spend approval cycle time in a software-as-service electronic spend management system based on community spend approval information.

FIG. 6 is a block diagram of an example computer system 600 that may be used in an implementation of linking customers and suppliers in a software-as-a-service electronic spend management system based on community supplier information.

Computer system 600 includes bus 602 or other communication mechanism for communicating information, and one or more hardware processors coupled with bus 602 for processing information. Hardware processor 604 may be, for example, a general-purpose microprocessor, a central processing unit (CPU) or a core thereof, a graphics processing unit (GPU), or a system on a chip (SoC).

Computer system 600 also includes a main memory 606, typically implemented by one or more volatile memory devices, coupled to bus 602 for storing information and instructions to be executed by processor 604. Main memory 606 also may be used for storing temporary variables or other intermediate information during execution of instructions by processor 604. Computer system 600 may also include read-only memory (ROM) 608 or other static storage device coupled to bus 602 for storing static information and instructions for processor 604. A storage system 610, typically implemented by one or more non-volatile memory devices, is provided and coupled to bus 602 for storing information and instructions.

Computer system 600 may be coupled via bus 602 to display 612, such as a liquid crystal display (LCD), a light emitting diode (LED) display, or a cathode ray tube (CRT), for displaying information to a computer user. Display 612 may be combined with a touch sensitive surface to form a touch screen display. The touch sensitive surface is an input device for communicating information including direction information and command selections to processor 604 and for controlling cursor movement on display 612 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 614, including alphanumeric and other keys, may be coupled to bus 602 for communicating information and command selections to processor 604.

Another type of user input device may be cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Instructions, when stored in non-transitory storage media accessible to processor 604, such as, for example, main memory 606 or storage system 610, render computer system 600 into a special-purpose machine that is customized to perform the operations specified in the instructions. Alternatively, customized hard-wired logic, one or more ASICs or FPGAs, firmware and/or hardware logic which in combination with the computer system causes or programs computer system 600 to be a special-purpose machine.

A computer-implemented process may be performed by computer system 600 in response to processor 604 executing one or more sequences of one or more instructions contained in main memory 606. Such instructions may be read into main memory 606 from another storage medium, such as storage system 610. Execution of the sequences of instructions contained in main memory 606 causes processor 604 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 610) and/or volatile media (e.g., main memory 606). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 602. Transmission media can also take the form of acoustic or light waves, such as those generated during radio-wave and infra-red data communications.

Computer system 600 also includes a network interface 618 coupled to bus 602. Network interface 618 provides a two-way data communication coupling to a wired or wireless network link 620 that is connected to a local, cellular or mobile network 622. For example, communication interface 118 may be IEEE 802.3 wired "ethernet" card, an IEEE 802.11 wireless local area network (WLAN) card, a IEEE 802.15 wireless personal area network (e.g., Bluetooth) card or a cellular network (e.g., GSM, LTE, etc.) card to provide a data communication connection to a compatible wired or wireless network. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through network 622 to local computer system 624 that is also connected to network 622 or to data communication equipment operated by a network access provider 626 such as, for example, an internet service provider or a cellular network provider. Network access provider 626 in turn provides data communication connectivity to another data communications network 628 (e.g., the internet). Networks 622 and 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the networks 622 and 628, network link 620 and communication interface 618. In the internet example, a remote computer system 630 might transmit a requested code for an application program through network 628, network 622 and communication interface 618. The received code may be executed by processor 604 as it is received, and/or stored in storage device 610, or other non-volatile storage for later execution.

Extensions and Alternatives

While foregoing embodiments are described by way of example to improving approval cycle times for purchase requisitions, invoices, or expense reports, one skilled in the art will appreciate from the foregoing description that the embodiments may also applied analogously to other types of approvals in various different approval chains including, but not limited to, those involving inventory management and supplier information management.

In the foregoing detailed description, various embodiments of improving spend approver cycle time in a software-as-service (Sass) electronic spend management system based on community spend approval information have been described with reference to numerous specific details that may vary from implementation to implementation. The specification and drawings are, accordingly, to be regarded in an illustrative rather than a restrictive sense.

What is claimed is:

1. A computer-implemented method executed using a software-as-a-service (SaaS)-based electronic spend management system that includes a plurality of customer instances and a plurality of users, the SaaS-based electronic spend management system having one or more hardware processors and storage media storing one or more computer programs having instructions configured to perform the method, the method comprising:

storing in each customer instance of the plurality of customer instances of the SaaS-based electronic spend management system, a private customer approval queue and private customer spend approval cycle time information on a per-customer basis;

computing spend approval cycle times across a community of the plurality of users of the customer instances of the SaaS-based electronic spend management system for a plurality of approval items;

computing community spend approval cycle time statistics including community average spend approval cycle times for each of purchase requisitions, expense reports and invoices;

real-time importing from one or more enterprise resource planning (ERP) systems into the spend management system other spend approval cycle time statistics using CSV files via a REST API of the spend management system;

causing a first web page with a first graphical user interface and a second web page with a second graphical user interface to be displayed on a home page of the electronic spend management system;

causing a first kind of icon of a particular user to be generated to graphically represent the particular user on a part of the first graphical user interface based on a first spend approval cycle time of the particular user being in a top percentile or a bottom percentile of a second approval cycle time corresponding to the community average spend approval cycle times, the first graphical user interface displaying the first kind of icon is associated with a graphical comparison between the first spend approval cycle time computed for the particular user and the second spend approval cycle time computed for the community of the plurality of users, including presenting, on the first web page of the first graphical user interface, a virtual queue comprising a graphical list of the plurality of approval items in an order of priority, time and date of approval, each approval item being associated with an escalation timer;

starting the escalation timer when a particular approval item comprising a requisition enters the virtual queue;

in response to the escalation timer of the requisition expiring, automatically adding the requisition to another virtual queue of a different user;

in response to the particular user performing an approval action on the requisition, stopping the escalation timer, computing the first spend approval cycle time, recording the first spend approval cycle time for the approval item and the particular user in the spend management system, creating and storing a purchase order for the requisition, and sending the purchase order to a supplier;

in response to the particular user selecting a first approval item from among the plurality of approval items in the virtual queue, causing a second kind of icon of the particular user to be generated on a part of the second graphical user interface based on the first spend approval cycle time of the particular user being in the top percentile or the bottom percentile of the second approval cycle time the second kind of icon is associated with a text notification specifying a difference between a first approval time value and a second approval time value and whether the difference is slower or faster.

2. The computer-implemented method of claim 1, the first graphical user interface displaying the virtual queue of one or more approval items awaiting an approval action, the first spend approval cycle time being computed based on spend approval cycle timers of each approval item, each approval item being associated with a respective escalation timer and a respective spend approval cycle timer.

3. The computer-implemented method of claim 1, the second graphical user interface displaying two or more images representing the particular user in an approval chain and one or more other approvers in the approval chain.

4. The computer-implemented method of claim 1, the comparison of the first graphical user interface indicating the first approval time value corresponding to the first spend approval cycle time adjacent to the second approval time value corresponding to the second spend approval cycle time.

5. The computer-implemented method of claim 1, the first spend approval cycle time being computed for the particular user as an average of spend approval cycle times for the particular user, and the second spend approval cycle time being computed for the community of the plurality of users as an average of spend approval cycle times for the plurality of users.

6. The computer-implemented method of claim 1, the first spend approval cycle time being computed for the particular user as a median of spend approval cycle times for the particular user, and the second spend approval cycle time being computed for the community of the plurality of users as a median of spend approval cycle times for the plurality of users.

7. The computer-implemented method of claim 1, wherein the first graphical user interface and the second graphical user interface are displayed as part of an electronic mail message.

8. One or more non-transitory computer-readable media coupled to a software-as-a-service (SaaS)-based electronic spend management system that includes a plurality of customer instances and a plurality of users, the media storing one or more sequences of instructions which when executed by one or more processors cause the one or more processors to perform:

storing in each customer instance of the plurality of customer instances of the SaaS-based electronic spend management system, a private customer approval queue and private customer spend approval cycle time information on a per-customer basis;

computing spend approval cycle times across a community of the plurality of users of the customer instances of the SaaS-based electronic spend management system for a plurality of approval items;

computing community spend approval cycle time statistics including community average spend approval cycle times for each of purchase requisitions, expense reports and invoices;

real-time importing from one or more enterprise resource planning (ERP) systems into the spend management system other spend approval cycle time statistics using CSV files via a REST API of the spend management system;

causing a first web page with a first graphical user interface and a second web page with a second graphical user interface to be displayed on a home page of the electronic spend management system;

causing a first kind of icon of a particular user to be generated to graphically represent the particular user on a part of the first graphical user interface based on a first spend approval cycle time of the particular user being in a top percentile or a bottom percentile of a second approval cycle time corresponding to the community average spend approval cycle times, the first graphical user interface displaying the first kind of icon is associated with a graphical comparison between the first spend approval cycle time computed for the particular user and the second spend approval cycle time computed for the community of the plurality of users, including presenting, on the first web page of the first graphical user interface, a virtual queue comprising a graphical list of the plurality of approval items in an order of priority, time and date of approval, each approval item being associated with an escalation timer;

starting the escalation timer when a particular approval item comprising a requisition enters the virtual queue;

in response to the escalation timer of the requisition expiring, automatically adding the requisition to another virtual queue of a different user;

in response to the particular user performing an approval action on the requisition, stopping the escalation timer, computing the first spend approval cycle time, recording the first spend approval cycle time for the approval item and the particular user in the spend management system, creating and storing a purchase order for the requisition, and sending the purchase order to a supplier;

in response to the particular user selecting a first approval item from among the plurality of approval items in the virtual queue, causing a second kind of icon of the particular user to be generated on a part of the second graphical user interface based on the first spend approval cycle time of the particular user being in the top percentile or the bottom percentile of the second approval cycle time the second kind of icon is associated with a text notification specifying a difference between a first approval time value and a second approval time value and whether the difference is slower or faster.

9. The one or more non-transitory computer-readable media of claim 8, the first graphical user interface displaying the approval virtual queue of one or more approval items awaiting an approval action, the first spend approval cycle time being computed based on spend approval cycle timers of each approval item, each approval item being associated with a respective escalation timer and a respective spend approval cycle timer.

10. The one or more non-transitory computer-readable media of claim 8, the second graphical user interface displaying two or more images representing the particular user in an approval chain and one or more other approvers in the approval chain.

11. The one or more non-transitory computer-readable media of claim 8, the comparison of the first graphical user interface indicating the first approval time value corresponding to the first spend approval cycle time adjacent to the second approval time value corresponding to the second spend approval cycle time.

12. The one or more non-transitory computer-readable media of claim 8, the first spend approval cycle time being computed for the particular user as an average of spend approval cycle times for the particular user, and the second spend approval cycle time being computed for the community of the plurality of users as an average of spend approval cycle times for the plurality of users.

13. The one or more non-transitory computer-readable media of claim 8, the first spend approval cycle time being computed for the particular user as a median of spend approval cycle times for the particular user, and the second spend approval cycle time being computed for the community of the plurality of users as a median of spend approval cycle times for the plurality of users.

14. The one or more non-transitory computer-readable media of claim 8, wherein the first graphical user interface and the second graphical user interface are displayed as part of an electronic mail message.

\* \* \* \* \*